(12) United States Patent
Liu

(10) Patent No.: US 7,176,987 B2
(45) Date of Patent: Feb. 13, 2007

(54) PORTABLE DVD PLAYER AND CONSOLE ARRANGEMENT

(76) Inventor: Edward Liu, 330 Turnbull Canyon Rd., City of Industry, CA (US) 91745

( * ) Notice: Subject to any disclaimer, the term of this patent is extended or adjusted under 35 U.S.C. 154(b) by 700 days.

(21) Appl. No.: 10/376,016

(22) Filed: Mar. 3, 2003

(65) Prior Publication Data
US 2004/0175155 A1 Sep. 9, 2004

(51) Int. Cl.
*H04N 5/64* (2006.01)
*H04N 5/00* (2006.01)

(52) U.S. Cl. ................ 348/838; 348/837; 386/125
(58) Field of Classification Search ............... 353/13, 353/72; 348/836, 837; 340/436, 903, 937; 345/649; 224/311, 548, 553, 929; 296/37.7, 296/37.8; 248/476; 386/46, 95, 124–126
See application file for complete search history.

(56) References Cited

U.S. PATENT DOCUMENTS

| | | | | |
|---|---|---|---|---|
| 5,822,023 | A * | 10/1998 | Suman et al. | 348/837 |
| 5,946,055 | A * | 8/1999 | Rosen | 348/837 |
| 6,115,086 | A * | 9/2000 | Rosen | 348/837 |
| 6,304,173 | B2 * | 10/2001 | Pala et al. | 340/461 |
| 6,339,455 | B1 * | 1/2002 | Allan et al. | 348/837 |
| 6,364,390 | B1 * | 4/2002 | Finneman | 296/37.7 |
| 6,412,848 | B1 * | 7/2002 | Ceccanese et al. | 296/37.7 |
| 6,443,574 | B1 * | 9/2002 | Howell et al. | 353/13 |
| 6,466,278 | B1 * | 10/2002 | Harrison et al. | 348/836 |
| 6,557,812 | B2 * | 5/2003 | Kutzehr et al. | 248/476 |
| 6,633,347 | B2 * | 10/2003 | Kitazawa | 348/837 |
| 6,663,155 | B1 * | 12/2003 | Malone et al. | 296/37.8 |
| 2001/0007609 | A1 * | 7/2001 | Mizoguchi et al. | 386/111 |
| 2002/0149708 | A1 * | 10/2002 | Nagata et al. | 348/837 |
| 2003/0063896 | A1 * | 4/2003 | Gonzalez Tovar et al. | 386/94 |
| 2004/0090998 | A1 * | 5/2004 | Chen | 370/537 |

* cited by examiner

*Primary Examiner*—Thai Q. Tran
*Assistant Examiner*—Mishawn Dunn
(74) *Attorney, Agent, or Firm*—Raymond Y. Chan; David and Raymond Patent Group

(57) ABSTRACT

A portable DVD player, having an output terminal, is detachably received in a console arrangement. The console arrangement includes a DVD player housing, which is adapted for securely supporting within an interior of a vehicle, having a receiving cavity to detachably receive the portable DVD player therein and including an output adapter, which is arranged for electrically extending from a power source of the vehicle, detachably connected to the output terminal of the portable DVD player so as to electrically connect the portable DVD player with respect to the power source of the vehicle.

20 Claims, 5 Drawing Sheets

PORTABLE DVD PLAYER AND CONSOLE ARRANGEMENT

BACKGROUND OF THE PRESENT INVENTION

1. Field of Invention

The present invention relates to an audio system, and more particularly to a portable DVD player and a console arrangement thereof which is capable of installing into a vehicle such that the portable DVD player can be detachably mounted in the console arrangement as a vehicle video system.

2. Description of Related Arts

Vehicle audio systems for vans and other large vehicles are well know wherein the conventional vehicle video system comprises a video display screen and a video device to keep passengers entertained on long journeys.

Due to the limited interior space of the vehicle, the configuration of the conventional vehicle video system is that the video device is installed at the dashboard of the vehicle to electrically connect with the power source thereof. The video display screen can be either mounted on the roof of the vehicle or at a rear side of the seat. The drawback of such conventional vehicle audio system is that the installation is costly and complicated.

The video device, such as a DVD player, must be permanently mounted to the dashboard in order to electrically connect to the power source of the vehicle in such a manner that the dashboard must provide an empty slot for the video device. In other words, other electronic device, such as audio device, or compartment must be substituted to compensate the installation of the video device.

Furthermore, when the video device is broken, the user must replace the whole system or must find a new video that is compatible with the video display screen. Therefore, it is a costly for the user to upgrade the video device while another installation fee of the video device must be paid.

In addition, such video device is specifically designed for vehicle so that once the video device is installed, the user is unable to detach the video device from the vehicle. It is costly that the user must purchase different sets of video devices for vehicle, home, and computer individually. In other words, there is no existing all-in-one video device can be multi-used for the home theater system, the vehicle video system, and even the computer system.

SUMMARY OF THE PRESENT INVENTION

A main object of the present invention is to provide a portable DVD player and a console arrangement thereof which is capable of installing into a vehicle such that the portable DVD player can be detachably mounted in the console arrangement as a vehicle video system.

Another object of the present invention is to provide a portable DVD player and a console arrangement thereof, wherein the portable DVD player can be detached from the vehicle and used as a home theater system. In other words, the portable DVD player can fit multiple systems to broaden the use of the DVD player.

Another object of the present invention is to provide a portable DVD player and a console arrangement thereof, wherein the terminal of the console arrangement is electrically connected to the power source of the vehicle, such that the portable DVD player can be easily connected to the power source so as to minimize the installation cost of the portable DVD player.

Another object of the present invention is to provide a portable DVD player and a console arrangement thereof, wherein the installing operation of the portable DVD player is easy and simple that by slidably mounting the portable DVD player into a receiving housing of the console arrangement so that the portable DVD player is electrically connected with the power source of the vehicle through the terminal.

Another object of the present invention is to provide a portable DVD player and a console arrangement thereof, wherein no expensive or complicated structure is required to employ in the present invention in order to achieve the above mentioned objects. Therefore, the present invention successfully provides an economic and efficient solution for installing the portable DVD player into the vehicle.

Accordingly, in order to accomplish the above objects, the present invention provides a portable DVD player, having an output terminal and a console arrangement comprising:

a DVD player housing, which is adapted for securely supporting within an interior of a vehicle, having a receiving cavity to detachably receive the portable DVD player therein and comprising an output adapter, which is arranged for electrically extending from a power source of the vehicle, detachably connected to the output terminal of the portable DVD player so as to electrically connect the portable DVD player with respect to the power source of the vehicle; and a locking means provided at the DVD player housing to releasably lock up the portable DVD player in the receiving cavity while the output terminal of the portable DVD player is connected to the output adapter of the DVD player housing, in such a manner that the portable DVD player is capable of detaching from the DVD player housing.

These and other objectives, features, and advantages of the present invention will become apparent from the following detailed description, the accompanying drawings, and the appended claims.

DETAILED DESCRIPTION OF THE PREFERRED EMBODIMENTS

Figure 1:
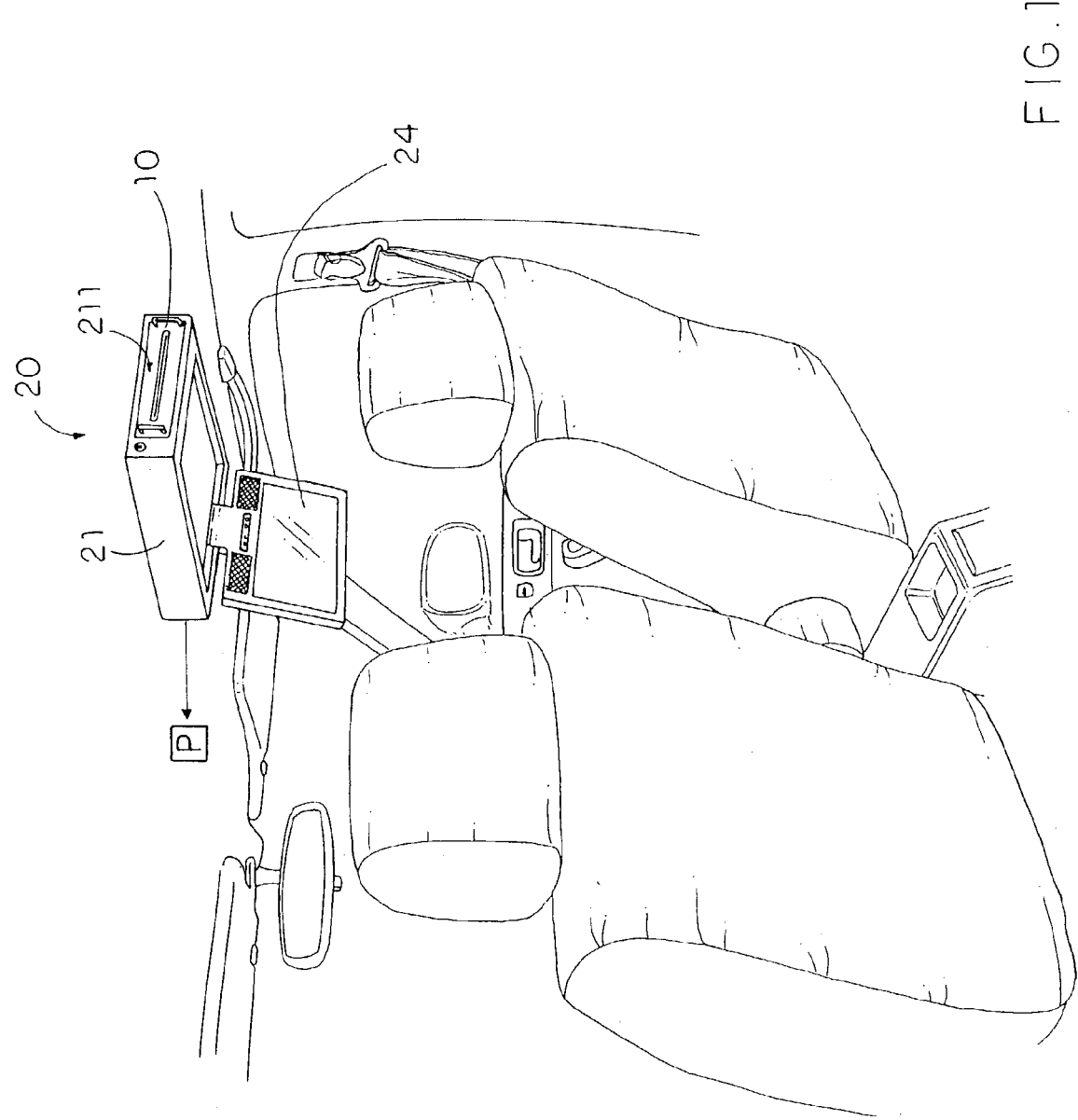
FIG. 1 is a perspective view of a portable DVD player and a console arrangement thereof according to a preferred embodiment of the present invention, illustrating the console arrangement being mounted on a roof of the vehicle.
Figure 2:
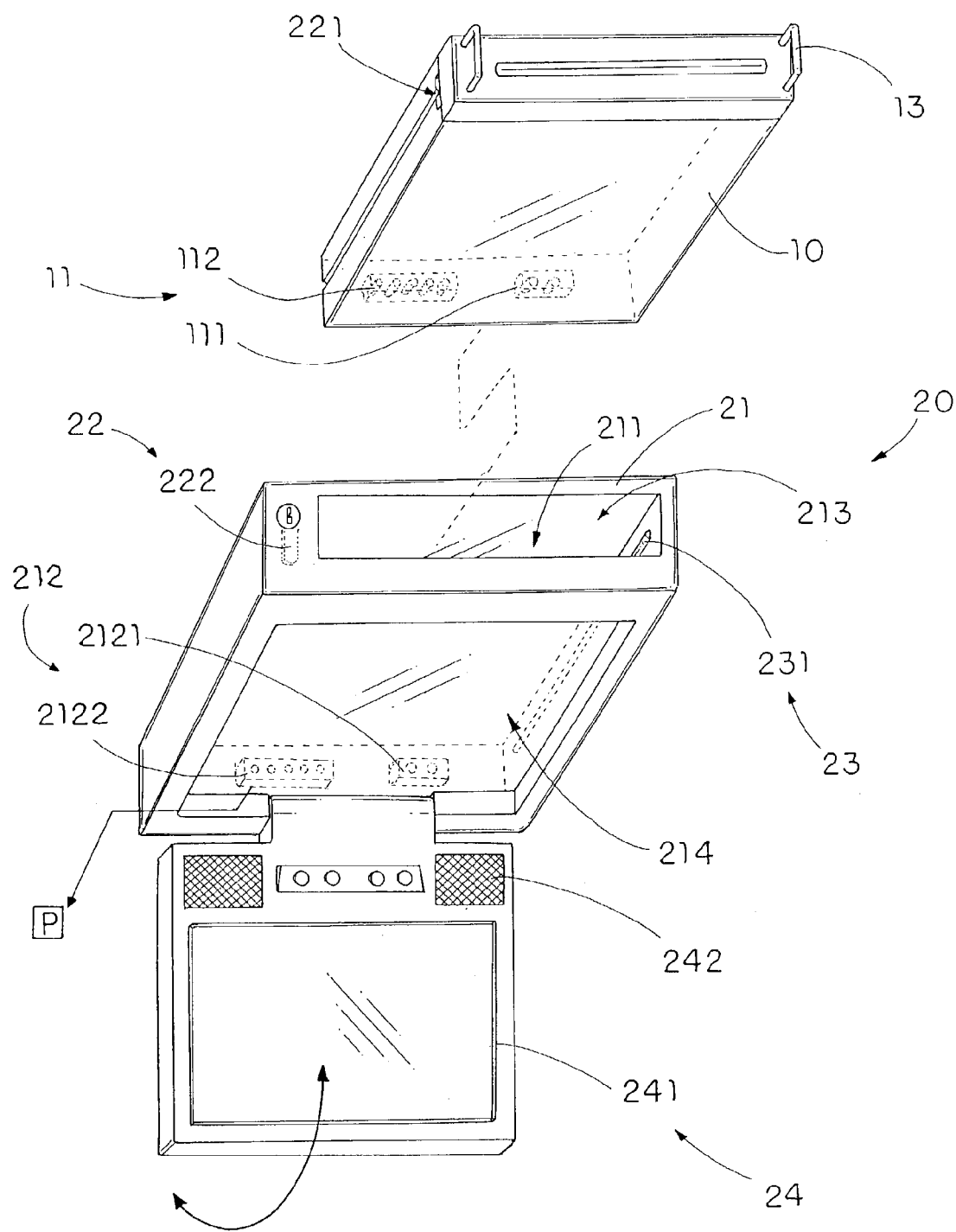
FIG. 2 is an exploded perspective view of the portable DVD player and the console arrangement thereof according to the above preferred embodiment of the present invention.

Referring to FIGS. 1 and 2 of the drawings, a portable DVD player 10 and a console arrangement 20 according to a preferred embodiment of the present invention are illustrated, wherein the portable DVD player 10, having an output terminal 11, is adapted to be detachably mounted to the console arrangement 20.

The console arrangement 20 comprises a DVD player housing 21, which is adapted for securely supporting within an interior of a vehicle, has a receiving cavity 211 to detachably receive the portable DVD player 10 therein and comprises an output adapter 212, which is arranged for electrically extending from a power source P of the vehicle, detachably connected to the output terminal 11 of the portable DVD player 10 so as to electrically connect the portable DVD player 10 with respect to the power source P of the vehicle.

The console arrangement further comprises a locking means 22 for securely locking up the portable DVD player 10 in the receiving cavity 211 of the DVD player housing 21.

According to the preferred embodiment, the portable DVD player 10, such as a conventional DVD player, comprises a reading lens arranged to read the storing data in the compact disc and an interface to convert the storing data into the digital data. Accordingly, the digital data contains all the necessary information of the storing data in the compact disc for both the video/audio and computer systems. The portable DVD player 10 is preferred to read and convert the audio format, such as wave and mp3, and the video format, such as video compact disc VCD, into the digital data, so as to broaden the use of the portable DVD player 10.

The output terminal 11 of the portable DVD player 10 comprises a power socket 111 and a signal socket 112 provided at a rear side thereof wherein the digital data, such as an audio signal and a video signal, is read via the reading lens and is transferred through the signal socket 112.

As shown in FIG. 1, the DVD player housing 21 is securely mounted on the roof of the vehicle wherein the DVD player housing 21 further has an opening 213 communicating with the receiving cavity 211 so that the portable DVD player 10 is received in the receiving cavity 211 through the opening 213.

Accordingly, the output adapter 212 of the console arrangement 20 is electrically connected to the power source P of the vehicle when the DVD player housing 21 is mounted on the roof the vehicle in such a manner that when the output terminal 11 of the portable DVD player 10 is connected to the output adapter 212 of the console arrangement 20, the portable DVD player 10 is automatically hooked up with the power source P of the vehicle, so that no further installation is required between the connection between the portable DVD player 10 and the power source P of the vehicle.

The output adapter 212 comprises a power connector 2121 electrically extended from the power source P of the vehicle to detachably connect the power socket 111 of the portable DVD player 10 and a signal connector 2122 arranged to detachably connect the signal socket 112 of the portable DVD player 10.

The console arrangement 20 further comprises a guiding unit 23 provided at the DVD player housing 21 to slidably guide the portable DVD player 10 in the receiving cavity 211, wherein the guiding unit 23 comprises two slider rails 231 formed at two sidewalls of the receiving cavity 211 to engage with two sides of the portable DVD player 10 respectively so that the portable DVD player 10 is slid into the receiving cavity 211 so as to retain the portable DVD player 10 within the DVD player housing 20 in position.

As shown in FIG. 2, the output adapter 212 of the console arrangement 20 is provided at a rear side of the receiving cavity 211 of the DVD player housing 21 in such a manner that when the portable DVD player 10 is slid into the receiving cavity 211 through the guiding unit 23, the output adapter 212 of the console arrangement 20 is aligned with the output terminal 11 of the portable DVD player 10 for guiding the portable DVD player 10 to connect with the power source P of the vehicle. In other words, the output terminal 11 of the portable DVD player 10 is guided to connect with the output adapter 212 of the console arrangement 20, so as to enhance the connecting operation of the portable DVD player 10 to the DVD player housing 21.

The locking means 22 has a locking slot 221 formed on the portable DVD player 10 and comprises a locking latch 222 movably mounted on the DVD player housing 21 and arranged to releasably engage with the locking slot 221 when the portable DVD player 10 is slid into the receiving cavity 211 so as to securely lock up the portable DVD player 10 in the DVD player housing 21.

For enhancing the detaching operation of the portable DVD player 10 from the DVD player housing 21, the DVD player 10 further comprises a releasable handle 13 mounted on a front side of the portable DVD player 10 in such a manner that when the portable DVD player 10 is in an unlocked position, the portable DVD player 10 is capable of slidably removing from the receiving cavity 211 via the releasable handle 13.

As shown in FIG. 2, the console arrangement 20 further comprises a signal output device 24 which comprises a display screen 241 foldably mounted at the DVD player housing 21 wherein the signal output device 24 is electrically connected to the output adapter 212 in such a manner that when the portable DVD player 10 is connected to the output adapter 212, the portable DVD player 10 is communicating with the display screen 241 for receiving a video signal through the output adapter 212.

Accordingly, the DVD player housing 21 further comprises a screen casing 214 provided at a bottom side thereof wherein the display screen 241 is pivotally mounted to the DVD player housing 21 such that the display screen 241 is capable of pivotally folding into the screen casing 214 for storage and downwardly folding out of the screen casing 214 for display. It is worth to mention that since the console arrangement 20 is an overhead type installation, the display screen 241 is preferably flipped downwardly for display. However, the console arrangement 20 can be supported on the floor of the vehicle so that the display screen 214 is flipped upwardly for display, as shown in FIG. 3A.

The signal output device 24 further comprises an audio output 242 electrically connected to the output adapter 212 for receiving an audio signal from the portable DVD player 10. The audio output 242, according to the preferred embodiment, comprises at least a speaker built-in with the vehicle in such a manner that no additional part is required to incorporate with the portable DVD player 10. It is worth to mention that when both the display screen 241 and the audio output 242 of the signal output device 24 are already installed into the vehicle, i.e. the display screen 241 is mounted at a rear side of the seat and the audio output 242 is the stock speaker, the user is able to simply connect the output adapter 212 to the signal output device 24 so as to communicate the portable DVD player 10 with the signal output device 24, as shown in FIG. 3B.

Figure 3A:
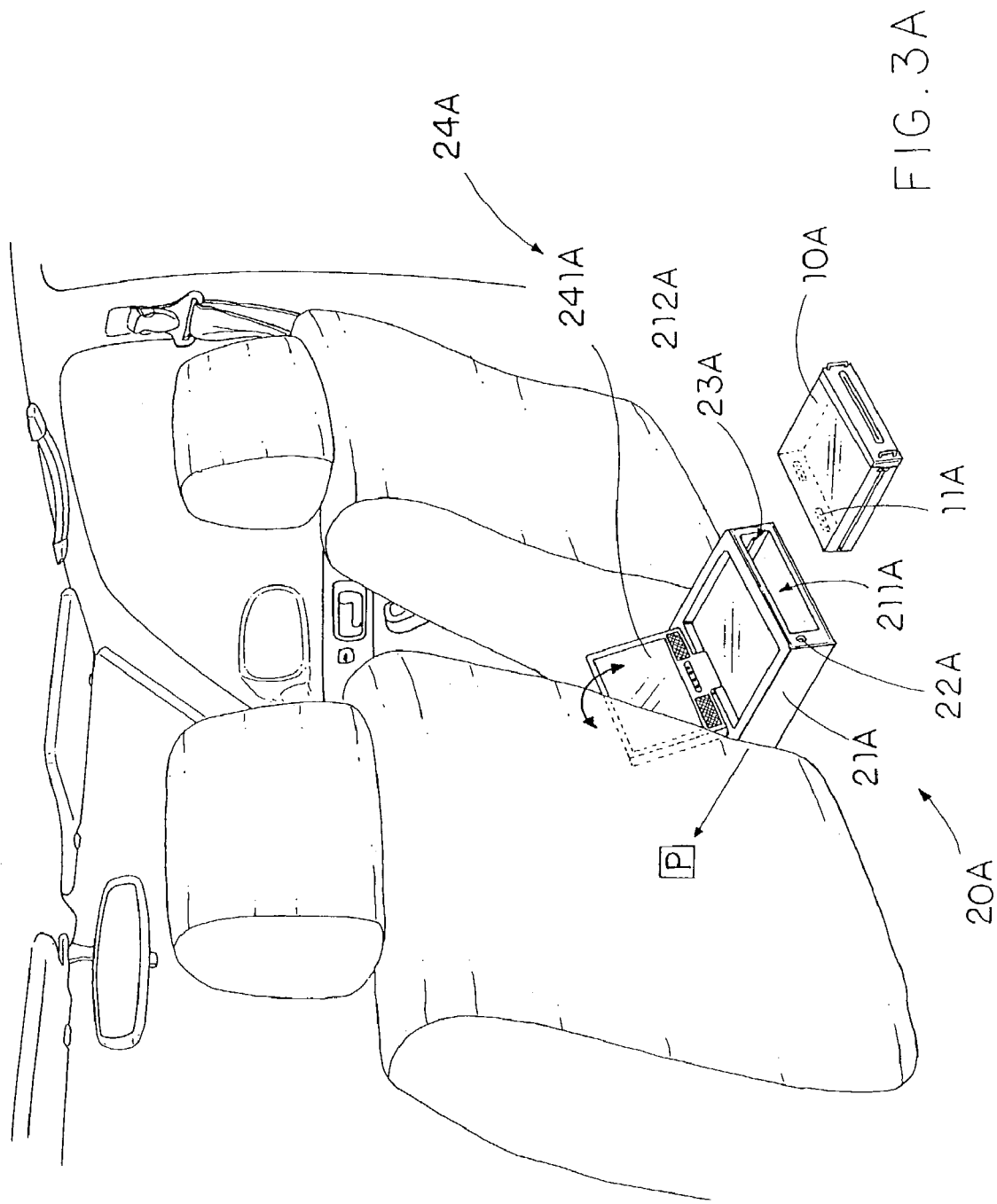
FIGS. 3A and 3B illustrate alternative modes of the console arrangement according to the above preferred embodiment of the present invention.
Figure 3B:
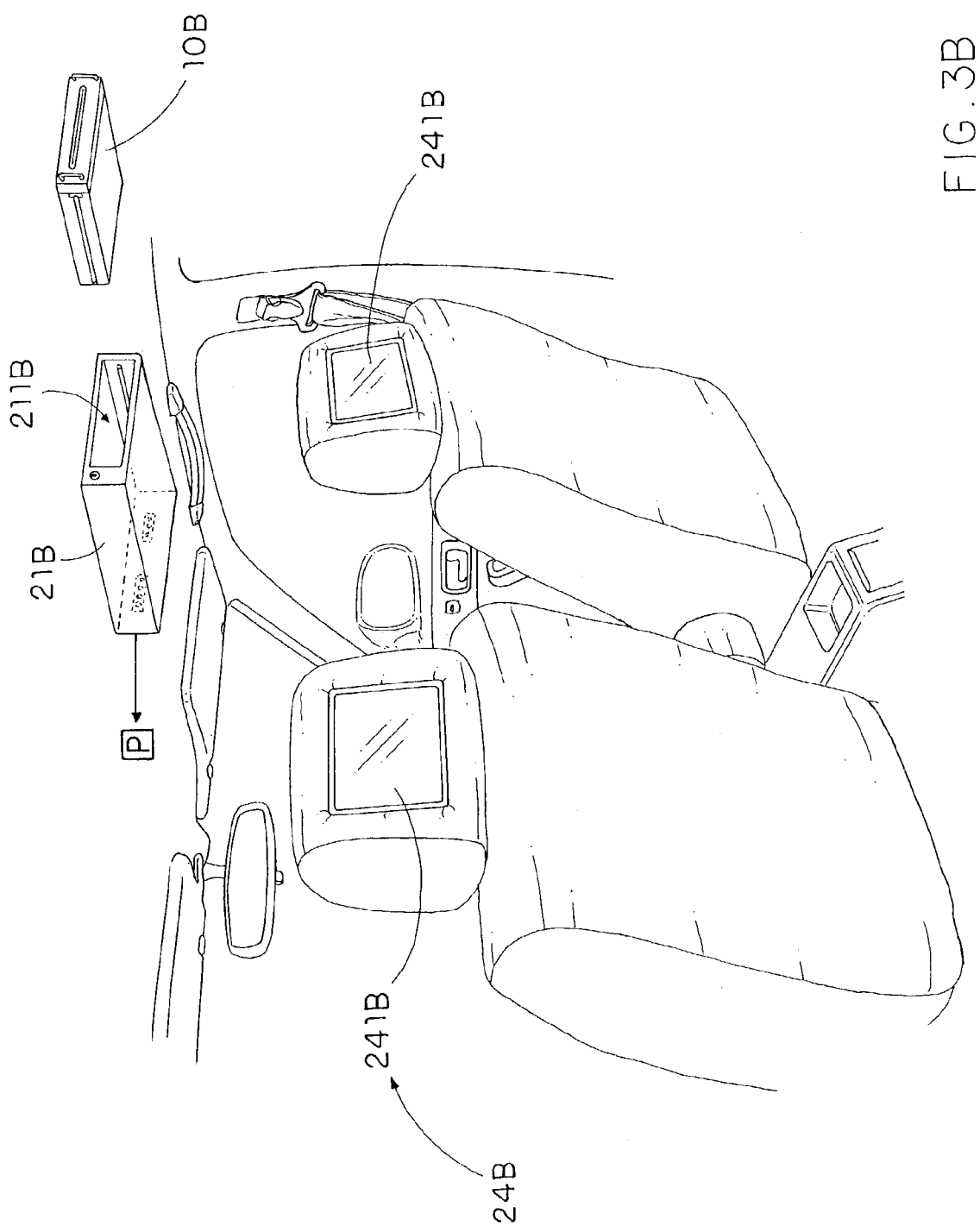

FIGS. 3A and 3B illustrates alternative modes of the console arrangement 20A, 20B. As shown in FIG. 3A, the console arrangement 20A is embodied as a floor stand supported on the floor of the vehicle wherein the output adapter 212A is electrically connected to the power source P of the vehicle such that the portable DVD player 10A is slid into the receiving cavity 211A of the DVD player housing 21A through the guiding unit 23A to electrically connect the output terminal 11A with the output adapter 212A while the portable DVD player 10A is locked up by the locking means 22A. The display screen 241A of the signal output device 24A is foldably mounted on top of the DVD player housing 21A so that the display screen 241A is adapted to be upwardly and pivotally folded with respect to the DVD player housing 21A for display.

FIG. 3B illustrates the console arrangement 20B is connected to the signal output device 24B which is pre-installed into the vehicle wherein the display screen 241B can be pivotally mounted on the roof, at the rear side of the seat, or at the dashboard of the vehicle in such a manner that when the portable DVD player 10B is connected to the output adapter 212B and is disposed in the receiving cavity 211B of the DVD player housing 21B, the portable DVD player 10B is automatically connected to the signal output device 24B to form the vehicle video system. In other words, the user does not need to change the original component, i.e. the signal output device 24B, in order to incorporate with the present invention.

Figure 4:
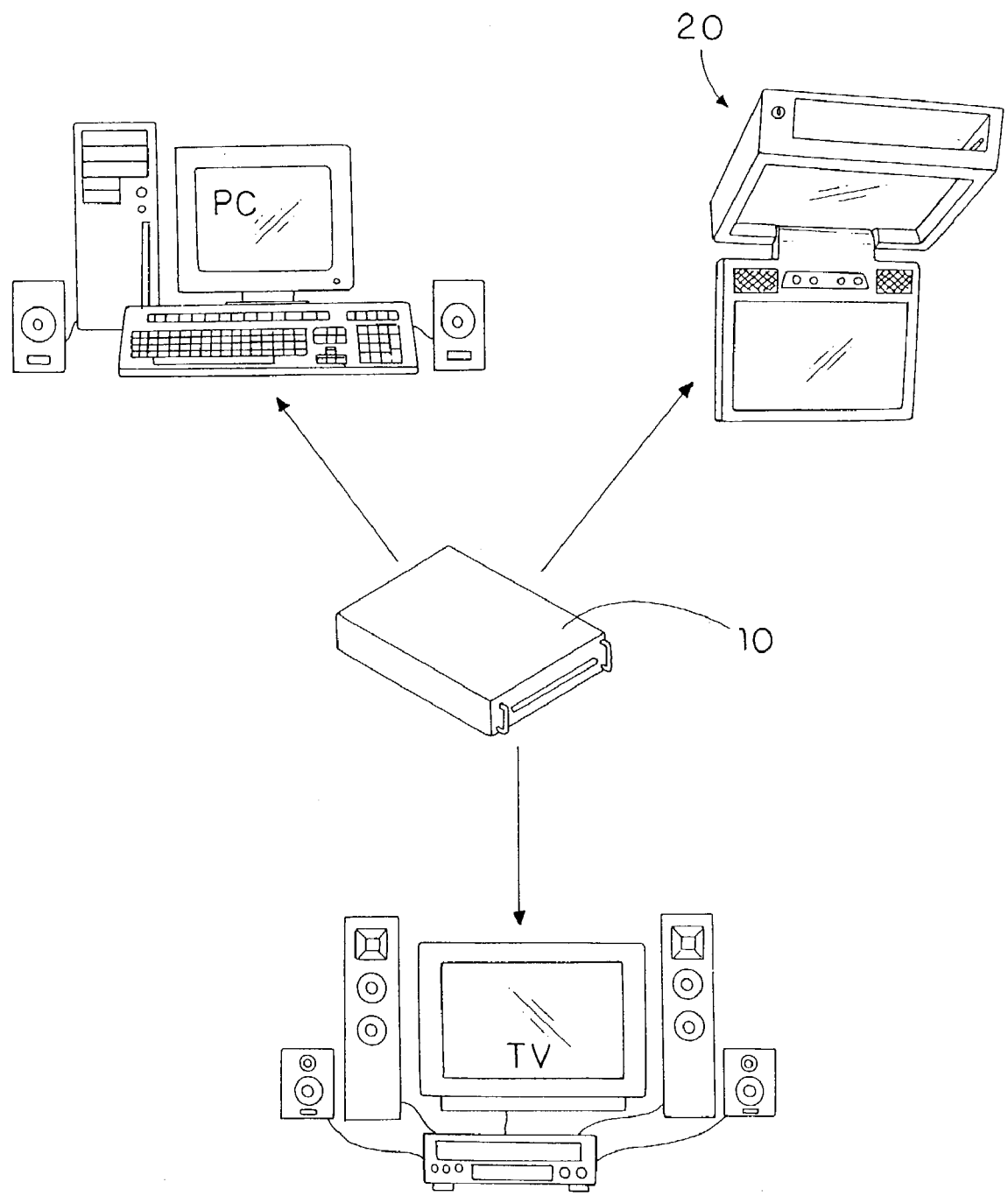
FIG. 4 illustrates the multi-use of the portable DVD player according to the above preferred embodiment of the present invention.

As shown in FIG. 4, the portable DVD player 10 is capable detaching from the console arrangement 20, the portable DVD player 10 can be incorporated with another system, such as the home theater system and/or the computer system. In other words, when the portable DVD player 10 is connected to the output adapter 212, the portable DVD player 10 functions as a vehicle video system to keep passengers entertained on long journeys. When the portable DVD player 10 is detached from the console arrangement 20, the portable DVD player 10 can be selectively hooked up to the television as a regular DVD player or to the computer as an external DVD drive. Due to the portability of the portable DVD player 10, the user only requires purchasing the portable DVD player 10 of the present invention as an all-in-one DVD reader in order to use it for vehicle and home entertainment, and the computer.

In order to connect the portable DVD player 10 with respect to the vehicle, the user is able to electrically connect the output terminal 11 of the portable DVD player 10 to the output adapter 212 of the console arrangement 22 and slide the portable DVD player 10 into the receiving cavity 211 of the DVD player housing 21 through the guiding unit 23 so as to mount the portable DVD player 10 in the DVD player housing 21. Then, the user is able to lock up the portable DVD player 10 within the receiving cavity 211 of the DVD player housing 21 via the locking means 22. Therefore, the installing operation of the portable DVD player 10 is easy and simple that an individual can connect the portable DVD player 10 to the vehicle without any complicated step, so as to minimize the installation cost of the portable DVD player 10.

It is worth to mention that the output terminal 11 of the portable DVD player 10 comprises means for electrically connecting to the television as the home theater wherein the connecting means is embodied as an audio/video an/or S-video output. Thus, the output terminal 11 of the portable DVD player 10 comprises means for electrically connecting the computer as the external DVD drive, wherein the connecting means is embodied as an "USB" and/or "FireWire" output.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. An entertainment system for a vehicle, comprising:
a portable data-reading device comprising a power socket and a signal socket provided at a rear side thereof; and
a console arrangement, which comprises;
a housing, which is adapted for securely supporting within an interior of said vehicle, having a receiving cavity to detachably receive said portable data-reading device therein and comprising an output adapter for electrically extending from a power source of said vehicle and a signal output device electrically coupling to said signal socket in a detachably connecting manner, wherein said power socket of said portable data-reading device is detachably coupled with said output adapter for electrically connecting said portable data-reading device with said power source of said vehicle; and
a display screen electrically connecting to said signal output device of said housing such that when said portable data-reading device is received in said receiving cavity of said housing to connect with said display screen, said display screen is communicating with said portable data-reading device for receiving digital data therefrom.

2. The entertainment system, as recited in claim 1, wherein said housing further comprises a screen casing pivotally coupling with said display screen such that said display screen is pivotally folded into said screen casing for storage and is pivotally folded out of said screen casing for displaying said digital data.

3. The entertainment system, as recited in claim 2, wherein said console arrangement further comprises a locking means for releasably locking said portable data-reading device in said receiving cavity of said housing.

4. The entertainment system, as recited in claim 2, wherein said portable data-reading device further comprises a releasable handle mounted on a front side thereof to slidably remove said portable data-reading device from said receiving cavity of said housing.

5. The entertainment system, as recited in claim 2, wherein said portable data-reading device further comprises means for electrically connecting to at least one of a computer and a television when said portable data-reading device is detached from said housing.

6. The entertainment system, as recited in claim 5, wherein said console arrangement further comprises a guiding unit provided at said housing to slidably guide said portable data-reading device in said receiving cavity, wherein said guiding unit comprises two slider rails formed at two sidewalls of said receiving cavity to engage with two sides of said portable data-reading device respective such that when said portable data-reading device is guided to slide in said receiving cavity, said power socket and said signal socket of said data-reading device are alignedly engaged with said output adapter and said signal output device of said housing respectively so as to retain said portable data-reading device within said housing in position.

7. The entertainment system, as recited in claim 6, wherein said portable data-reading device is a portable DVD player detachably received in said housing to electrically connect with said display screen.

8. The entertainment system, as recited in claim 7, wherein said console arrangement further comprises a locking means for releasably locking said portable data-reading device in said receiving cavity of said housing.

9. The entertainment system, as recited in claim 8, wherein said portable data-reading device further comprises a releasable handle mounted on a front side thereof to slidably remove said portable data-reading device from said receiving cavity of said housing.

10. The entertainment system, as recited in claim 1, wherein said display screen, which is adapted for pre-installing to said interior of said vehicle to electrically connect to said signal device of said housing, is automatically connected to said portable data-reading device when said portable data-reading device is detachably mounted in said housing.

11. The entertainment system, as recited in claim 10, wherein said console arrangement further comprises a locking means for releasably locking said portable data-reading device in said receiving cavity of said housing.

12. The entertainment system, as recited in claim 10, wherein said portable data-reading device further comprises a releasable handle mounted on a front side thereof to slidably remove said portable data-reading device from said receiving cavity of said housing.

13. The entertainment system, as recited in claim 10, wherein said portable data-reading device further comprises means for electrically connecting to at least one of a computer and a television when said portable data-reading device is detached from said housing.

14. The entertainment system, as recited in claim 13, wherein said console arrangement further comprises a guiding unit provided at said housing to slidably guide said portable data-reading device in said receiving cavity, wherein said guiding unit comprises two slider rails formed at two sidewalls of said receiving cavity to engage with two sides of said portable data-reading device respective such that when said portable data-reading device is guided to slide in said receiving cavity, said power socket and said signal socket of said data-reading device are alignedly engaged with said output adapter and said signal output device of said housing respectively so as to retain said portable data-reading device within said housing in position.

15. The entertainment system, as recited in claim 14, wherein said portable data-reading device is a portable DVD player detachably received in said housing to electrically connect with said display screen.

16. The entertainment system, as recited in claim 15, wherein said console arrangement further comprises a locking means for releasably locking said portable data-reading device in said receiving cavity of said housing.

17. The entertainment system, as recited in claim 16, wherein said portable data-reading device further comprises a releasable handle mounted on a front side thereof to slidably remove said portable data-reading device from said receiving cavity of said housing.

18. The entertainment system, as recited in claim 1, wherein said portable data-reading device further comprises means for electrically connecting to at least one of a computer and a television when said portable data-reading device is detached from said housing.

19. The entertainment system, as recited in claim 1, wherein said console arrangement further comprises a guiding unit provided at said housing to slidably guide said portable data-reading device in said receiving cavity, wherein said guiding unit comprises two slider rails formed at two sidewalls of said receiving cavity to engage with two sides of said portable data-reading device respective such that when said portable data-reading device is guided to slide in said receiving cavity, said power socket and said signal socket of said data-reading device are alignedly engaged with said output adapter and said signal output device of said housing respectively so as to retain said portable data-reading device within said housing in position.

20. The entertainment system, as recited in claim 1, wherein said portable data-reading device is a portable DVD player detachably received in said housing to electrically connect with said display screen.

* * * * *